United States Patent
Prakash et al.

(10) Patent No.: US 8,335,202 B2
(45) Date of Patent: Dec. 18, 2012

(54) SENDING PILOTS ON SECONDARY CHANNELS FOR IMPROVED ACQUISITION AND HANDOFF IN CELLULAR COMMUNICATION

(75) Inventors: Rajat Prakash, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1432 days.

(21) Appl. No.: 11/941,907

(22) Filed: Nov. 16, 2007

(65) Prior Publication Data

US 2008/0159234 A1    Jul. 3, 2008

Related U.S. Application Data

(60) Provisional application No. 60/866,506, filed on Nov. 20, 2006.

(51) Int. Cl.
*H04J 1/00* (2006.01)
(52) U.S. Cl. ...................................... 370/343; 455/562.1
(58) Field of Classification Search .................. 370/343; 455/562.1
See application file for complete search history.

(56) References Cited

U.S. PATENT DOCUMENTS

| | | | |
|---|---|---|---|
| 4,304,000 A | 12/1981 | Bonnerot et al. | |
| 5,680,395 A | 10/1997 | Weaver, Jr. et al. | |
| 6,360,098 B1* | 3/2002 | Ganesh et al. | 455/436 |
| 6,993,333 B2 | 1/2006 | Laroia et al. | |
| 7,869,416 B2* | 1/2011 | Ramakrishna et al. | 370/345 |
| 2003/0124994 A1* | 7/2003 | Ylitalo | 455/91 |
| 2004/0132494 A1 | 7/2004 | Tirkkonen et al. | |
| 2005/0002442 A1 | 1/2005 | Litwin et al. | |
| 2008/0020779 A1* | 1/2008 | Ode et al. | 455/450 |
| 2009/0161634 A1* | 6/2009 | Tiedemann et al. | 370/335 |

FOREIGN PATENT DOCUMENTS

CN    1722635 A    1/2006

(Continued)

OTHER PUBLICATIONS

Partial International Search Report—PCT/US07/085285—International Search Authority, European Patent Office, May 15, 2008.

(Continued)

*Primary Examiner* — Sai-Ming Chan
(74) *Attorney, Agent, or Firm* — Abdellala Kafloab; Darren M. Sweri

(57) ABSTRACT

Systems and methodologies are described that facilitate enhancing acquisition and handoff in a wireless network deployment by leveraging primary pilots and secondary pilots. The deployment can support more than one frequency band for operation, yet a mobile device can receive signals on one frequency band at a given time. Thus, a base station can transmit primary pilot(s) over frequency band(s) associated with operating data channel(s) as well as secondary pilot(s) over frequency band(s) that lack data channel(s) for the base station. Moreover, the base station can convey information that indicates to a mobile device whether each pilot is primary or secondary. Further, the mobile device can employ knowledge of pilot type (e.g., primary or secondary) as well as signal strength to effectuate handoff decisions; thus, disruptions in communication can be mitigated.

24 Claims, 11 Drawing Sheets

FOREIGN PATENT DOCUMENTS

| | | |
|---|---|---|
| EP | 07097318 | 9/1997 |
| EP | 1324510 | 7/2003 |
| RU | 2120702 C1 | 10/1998 |
| WO | 0169949 | 9/2001 |
| WO | 0178254 | 10/2001 |
| WO | 0189112 | 11/2001 |
| WO | WO2006113188 A2 | 10/2006 |

OTHER PUBLICATIONS

International Search Report—PCT/US07/085285—International Search Authority, European Patent Office—Oct. 6, 2008.
Written Opinion—PCT/US07/085285—International Search Authority, European Patent Office—Oct. 6, 2008.
Taiwan Search Report—TW096143975—TIPO—Jul. 7, 2011.

* cited by examiner

SENDING PILOTS ON SECONDARY CHANNELS FOR IMPROVED ACQUISITION AND HANDOFF IN CELLULAR COMMUNICATION

CROSS-REFERENCE TO RELATED APPLICATIONS

This application claims the benefit of U.S. Provisional Patent application Ser. No. 60/866,506 entitled "SENDING PILOTS ON SECONDARY CHANNELS FOR IMPROVED ACQUISITION AND HANDOFF IN CELLULAR COMMUNICATION" which was filed Nov. 20, 2006. The entirety of the aforementioned application is herein incorporated by reference.

BACKGROUND

1. Field

The following description relates generally to wireless communications, and more particularly to employing pilots communicated via secondary channels to enhance handing off in a wireless communication system.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Handoffs commonly occur within wireless communication systems. For instance, handoffs can occur between base stations and/or base station sectors. Handing off can be effectuated by a mobile device measuring a strength of a signal transmitted by one or more base stations and/or sectors. Wireless network deployments oftentimes use more than one frequency band for operation, while a mobile device typically has hardware capability to receive on only one frequency band at a time. Thus, the mobile device experiences diminished operating ability when in a geographic region where two (or more) signals are present, where at least one signal is from a first frequency band and at least another signal is from a second frequency band. In particular, the mobile device can be communicating on the first frequency band. Moreover, to measure the signal strength on the second frequency band (e.g., to enable handing off to a base station that operates upon the second frequency band), the mobile device commonly has to tune away from the first frequency band (e.g., since the mobile device can be unable to receive signals on more than one frequency band at a given time). Such tuning away can cause disruption in communication on the first frequency band, thereby diminishing quality of service. Further, conventional tuning away oftentimes necessitates utilizing a signaling protocol that can mitigate such disruption, which can be computationally expensive. Moreover, complex hardware design typically can be used to support fast switching between frequencies for these conventional techniques.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating enhancement of acquisition and handoff in a wireless network deployment by leveraging primary pilots and secondary pilots. The deployment can support more than one frequency band for operation, yet a mobile device can receive signals on one frequency band at a given time. Thus, a base station can transmit primary pilot(s) over frequency band(s) associated with operating data channel(s) as well as secondary pilot(s) over frequency band(s) that lack data channel(s) for the base station. For instance, a frequency band employed to transfer a secondary pilot can be a different channel within a same BandClass or a channel on a different BandClass as a frequency band utilized to send a primary pilot. Moreover, the base station can convey information that indicates to a mobile device whether each pilot is primary or secondary. Further, the mobile device can employ knowledge of pilot type (e.g., primary or secondary) as well as signal strength to effectuate handoff decisions; thus, disruptions in communication can be mitigated.

According to related aspects, a method that facilitates communicating pilots upon differing frequency bands in a wireless communication environment is described herein. The method can include transmitting a primary pilot on a first frequency band, the first frequency band is utilized by a base station to operate a data channel. Further, the method can comprise transmitting a secondary pilot on a second frequency band that lacks an operating data channel for the base station. Moreover, the method can include conveying information that indicates to a mobile device whether a pilot is primary or secondary.

Another aspect relates to a wireless communications apparatus. The wireless communications apparatus can include a memory that retains instructions related to transferring a first pilot on a first frequency band, transferring a second pilot on a second frequency band, transferring information which indicates that the first pilot is a primary pilot, and transferring information which indicates that the second pilot is a secondary pilot, wherein a data channel for a base station employs the first frequency band and is lacking from the second frequency. Further, the wireless communications apparatus can include a processor, coupled to the memory, configured to execute the instructions retained in the memory.

Yet another aspect relates to a wireless communications apparatus that enables communicating pilots for enhancing handoff in a wireless communication environment. The wireless communications apparatus can include means for sending a primary pilot on a first bandwidth that is employed by a base station to operate a data channel. Further, the wireless communications apparatus can comprise means for sending a secondary pilot on a second bandwidth that lacks an operating data channel for the base station. Moreover, the wireless communications apparatus can include means for transmitting information that identifies whether each pilot is primary or secondary.

Still another aspect relates to a machine-readable medium having stored thereon machine-executable instructions for transferring a primary pilot on a first bandwidth that is employed by a base station to operate a data channel; transferring a secondary pilot on a second bandwidth that lacks an operating data channel associated with the base station; and transferring a Pilot Description Record (PDR) that indicates to a mobile device whether each pilot is primary or secondary.

In accordance with another aspect, an apparatus in a wireless communication system can include a processor, wherein the processor can be configured to transmit a primary pilot on a first bandwidth that is employed by a base station to operate a data channel. Further, the processor can be configured to transmit a secondary pilot on a second bandwidth that lacks an operating data channel associated with the base station. Moreover, the processor can be configured to transmit a Pilot Description Record (PDR) that indicates to a mobile device whether each pilot is primary or secondary.

According to other aspects, a method that facilitates evaluating pilots to enable handing off within a wireless communication environment is described herein. The method can include monitoring a set of pilots from differing base stations on a common frequency band, where the set includes at least one primary pilot and at least one secondary pilot. Further, the method can include determining a strongest pilot from the set of monitored pilots with a highest signal strength. Moreover, the method can comprise identifying whether the strongest pilot is a primary pilot or a secondary pilot based upon received information.

Yet another aspect relates to a wireless communications apparatus that can include a memory that retains instructions related to monitoring pilots on one bandwidth from a plurality of base stations, measuring signal strengths of the pilots, determining a particular pilot with the highest signal strength, and determining whether the strongest pilot is primary or secondary based upon information in a Pilot Description Record (PDR), wherein the monitored pilots include at least one primary pilot and at least one secondary pilot. Further, the wireless communications apparatus can comprise a processor, coupled to the memory, configured to execute the instructions retained in the memory.

Another aspect relates to a wireless communications apparatus that enables handing off utilizing primary and secondary pilots in a wireless communication environment. The wireless communications apparatus can include means for obtaining a set of pilots from more than one base station, where the set of pilots includes at least one primary pilot and at least one secondary pilot. Moreover, the wireless communications apparatus can comprise means for measuring signal strengths associated with each of the obtained pilots in the set. Further, the wireless communications apparatus can include means for determining whether obtained pilots are primary or secondary based upon received information.

Still another aspect relates to a machine-readable medium having stored thereon machine-executable instructions for obtaining a set of pilots upon one frequency band from more than one base station, where the set of pilots includes at least one primary pilot and at least one secondary pilot, measuring signal strengths associated with each of the obtained pilots in the set, and determining whether the obtained pilots are primary or secondary based upon information included in a Pilot Description Record (PDR).

In accordance with another aspect, an apparatus in a wireless communication system can include a processor, wherein the processor can be configured to monitor pilots on one bandwidth from a plurality of base stations, the pilots include at least one primary pilot and at least one secondary pilot. Further, the processor can be configured to measure signal strengths of the pilots. Moreover, the processor can be configured to determine a strongest pilot with the highest signal strength. The processor can additionally be configured to determine whether the strongest pilot is primary or secondary based upon information in a Pilot Description Record (PDR).

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
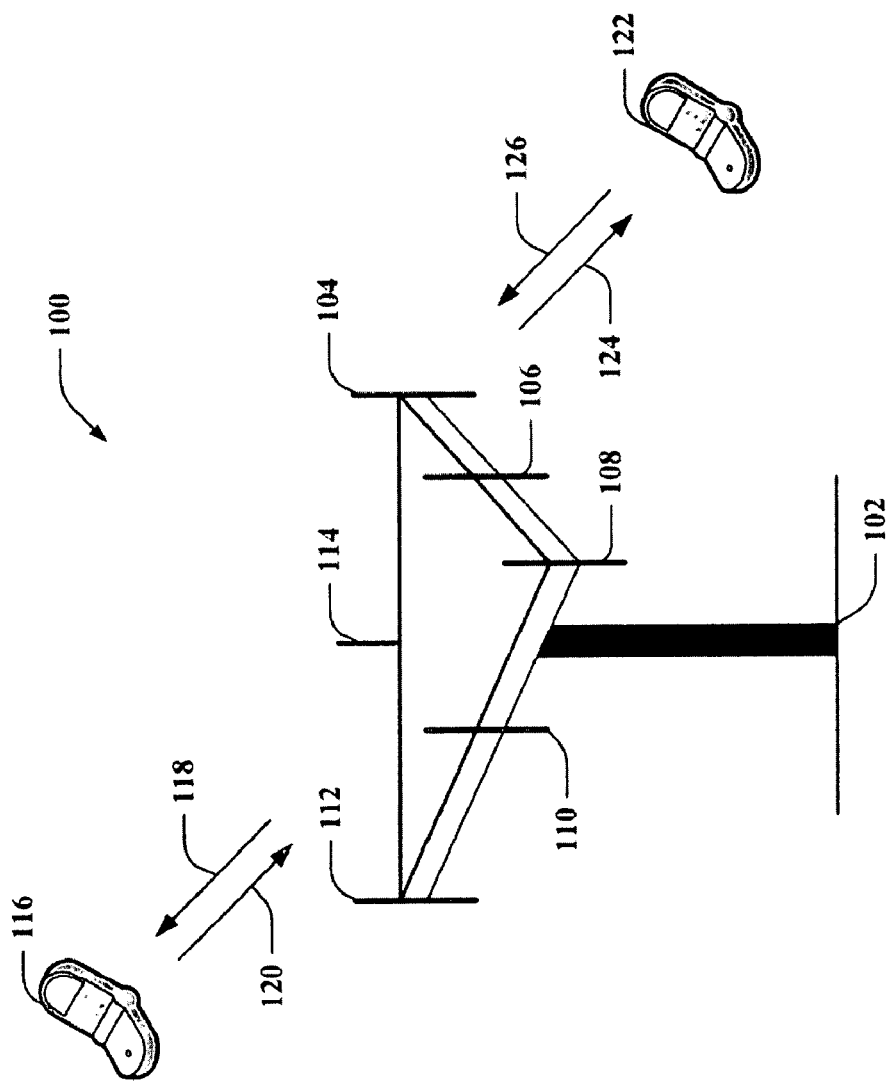
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

System 100 can utilize a plurality of channels (e.g., frequency bands, channel bands, bandwidths, . . . ) for operation. Mobile devices 116 and 122 can receive data on one channel at a given time. Further, base station 102 can utilize a primary channel (or a set of primary channels) to communicate data to mobile devices 116 and 122. The set of primary channels utilized by base station 102 can include a subset of the total plurality of channels supported by system 100; thus, if system 100 supports ten channels, base station 102 can have fewer than ten primary channels (e.g., one, two, three, . . . ). By way of example, mobile devices 116 and 122 can receive data from base station 102 communicated over a particular primary channel (e.g., a first frequency band), while a differing mobile device (not shown) can obtain data from a disparate base station (not shown) via a disparate primary channel (e.g., a second frequency band). Following this example, mobile devices 116 and 122 can be geographically located such that signals from both base station 102 and the disparate base station can be obtained; however, mobile devices 116 and 122 are typically unable to simultaneously receive signals in the differing frequency bands. Thus, conventional handoff techniques oftentimes involve a mobile device (e.g., mobile device 116, 122) disconnecting from a first base station (e.g., base station 102) while searching for a second base station (e.g., disparate base station) to which to handoff. In contrast to such conventional techniques, system 100 enhances acquisition and handoff without the aforementioned disruption in communication.

System 100 enables primary pilots and secondary pilots to be communicated by base stations (e.g., base station 102). A primary pilot is a pilot transmitted on a frequency by a base station (or sector) where there is a data channel transmitted by the base station (or sector) on the same frequency. Moreover, a secondary pilot is a pilot transmitted on a frequency by a base station (or sector) where there is no data channel transmitted by the base station (or sector) on the same frequency. For instance, a frequency employed to transfer a secondary pilot can be a different channel within a same BandClass or a channel on a different BandClass as a frequency utilized to send a primary pilot. According to an illustration, system 100 can support ten channels; two of these channels can be primary channels for base station 102. Base station 102 can send primary pilots upon the two primary channel as well as secondary pilots upon the remaining eight channels (e.g., non-primary channels) supported by system 100. Thus, regardless of the channel upon which a mobile device (e.g., mobile device 116, 122) that is within range of base station 102 is operating, a primary or secondary pilot can be obtained from base station 102. Further, information related to whether the pilot is a primary pilot or a secondary pilot can be communicated to the mobile device. Moreover, mobile devices 116 and 122 can monitor signal strengths associated with received pilot(s) and/or determine whether to effectuate a handoff while mitigating disruption of communication.

Figure 2:
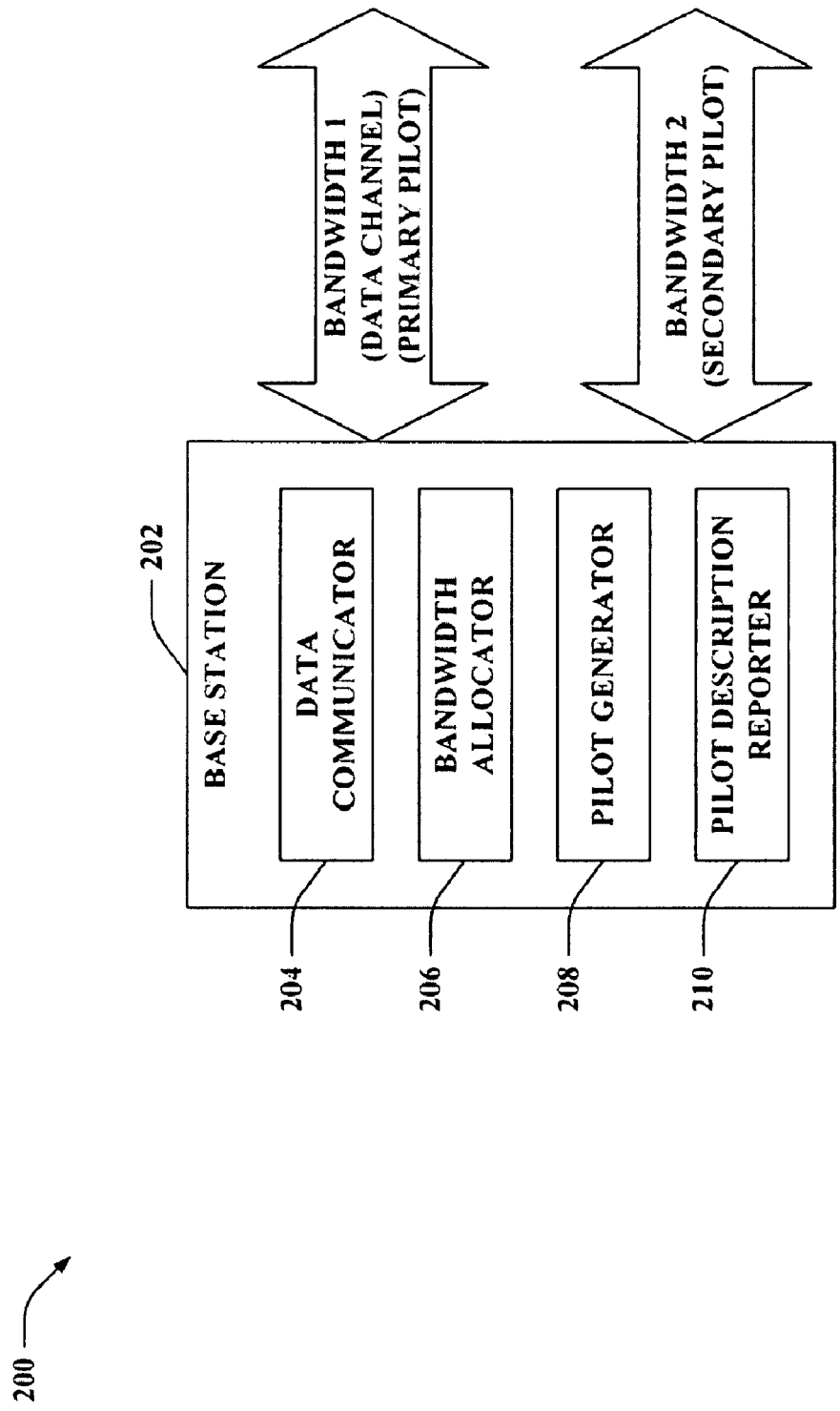
FIG. 2 is an illustration of an example system that enables communicating primary pilots and secondary pilots to enhance acquisition and handoff in a wireless communication environment.

With reference to FIG. 2, illustrated is a system 200 that enables communicating primary pilots and secondary pilots to enhance acquisition and handoff in a wireless communication environment. System 200 includes a base station 202 that can communicate with one or more mobile devices (not shown). Moreover, base station 202 can communicate with other base station(s) and/or any disparate devices (e.g., servers) (not shown) that can perform functions such as, for example, authentication, authorization, accounting, billing, and so forth.

Base station 202 can further include a data communicator 204, a bandwidth allocator 206, a pilot generator 208, and a pilot description reporter 210. Data communicator 204 can enable base station 202 to transmit data to and/or receive data from one or more mobile devices (e.g., via the uplink and/or downlink). For instance, base station 202 can be associated with one or more primary channels; accordingly, data communicator 204 can facilitate communicating data via data channel(s) that utilize frequency band(s) associated with such primary channel(s). As illustrated, data communicator 204 can enable data to be transferred to and/or from base station 202 by employing a data channel upon bandwidth 1; however, it is to be appreciated that the claimed subject matter is not limited to this example.

Bandwidth allocator 206 can control a bandwidth over which data is transferred to and/or from base station 202 (e.g., by employing data communicator 204) and/or a bandwidth upon which a pilot can be transmitted. Pursuant to an example, bandwidth allocator 206 can assign a first bandwidth for utilization by data communicator 204; thus, the first bandwidth can be employed for communicating data via the data channel. Moreover, bandwidth allocator 206 can allot bandwidth(s) to be utilized for communicating differing types of pilot(s) (e.g., primary pilot, secondary pilot). Thus, for example, bandwidth allocator 206 can control pilot generator 208 to transfer primary pilots over bandwidth 1 and secondary pilots over bandwidth 2. The pilot related bandwidth assignments effectuated by bandwidth allocator 206 can be a function of the bandwidth assignments for the data channel.

Pilot generator 208 can yield a pilot indicative of base station 202. It is contemplated that pilot generator 208 can generate primary pilot(s) and/or secondary pilot(s). The pilot can be, for example, a beacon or a sequence of beacons; however, the claimed subject matter is not so limited. Further, pilot generator 208 can incorporate various information into the pilot. Moreover, pilot generator 208 can utilize bandwidth assignments yielded by bandwidth allocator 206 to send primary pilot(s) over a primary channel (e.g., bandwidth 1) and secondary pilot(s) over a non-primary channel (e.g., bandwidth 2). Pilot generator 208 can periodically transmit the pilot(s), send the pilot(s) at random times, at times determined as a function of an identity (e.g., identity of base station 202, the sector, . . . ), and so forth. By utilizing pilot generator 208, base station 202 can transmit pilots over its own primary channel(s) as well as any additional channels in a wireless network deployment (e.g., since a mobile device can be listening to any channel supported by the deployment at a particular time that may or may not be a primary channel of base station 202).

Pilot description reporter 210 can generate and/or transmit information associated with pilot(s) yielded by pilot generator 208 to mobile device(s). For instance, pilot description reporter 210 can create a Pilot Description Record (PDR). Additionally or alternatively, pilot description reporter 210 can retrieve the PDR from memory. The PDR can include, for instance, a number of pilots transmitted by base station 202 (or the sector) for each pilot, an identifier of the pilot (e.g., physical layer identification of the pilot, PilotID, . . . ), a frequency band, whether the pilot is primary or secondary, a mapping of physical layer information (e.g., pilotID and channel-band of a secondary pilot mapped to a channel-band of a corresponding primary pilot), a transmit power of the pilot, and/or other physical layer information about the pilot such as, for example, cyclic prefix, duration, etc. for an OFDM pilot. Pilot description reporter 210 can send a PDR via the data channel (e.g., associated with a primary pilot), a control channel, and so forth. According to another example, pilot description reporter 210 can incorporate at least a portion of the information included in the PDR into the pilot yielded by pilot generator 208. Thus, a mobile device that receives a pilot from base station 202 can evaluate information included in the PDR to determine whether the pilot is a primary pilot or a secondary pilot.

Pilot description reporter 210 can also send the PDR to disparate base station(s) (or differing sector(s)) (not shown) and/or receive PDR(s) from such disparate base station(s) (or differing sector(s)). PDR(s) from neighboring base stations (or neighboring sectors) can be combined together by pilot description reporter 210 to generate a pilot neighbor record (PNR). Information from any number of neighbors can be included in the PNR; for instance, the union of PDRs from the N strongest neighbors can be utilized for yielding the PNR, where N can be any integer. The PNR can thereafter be retained in memory, sent via a downlink (e.g., to one or more mobile devices), and so forth.

Figure 3:
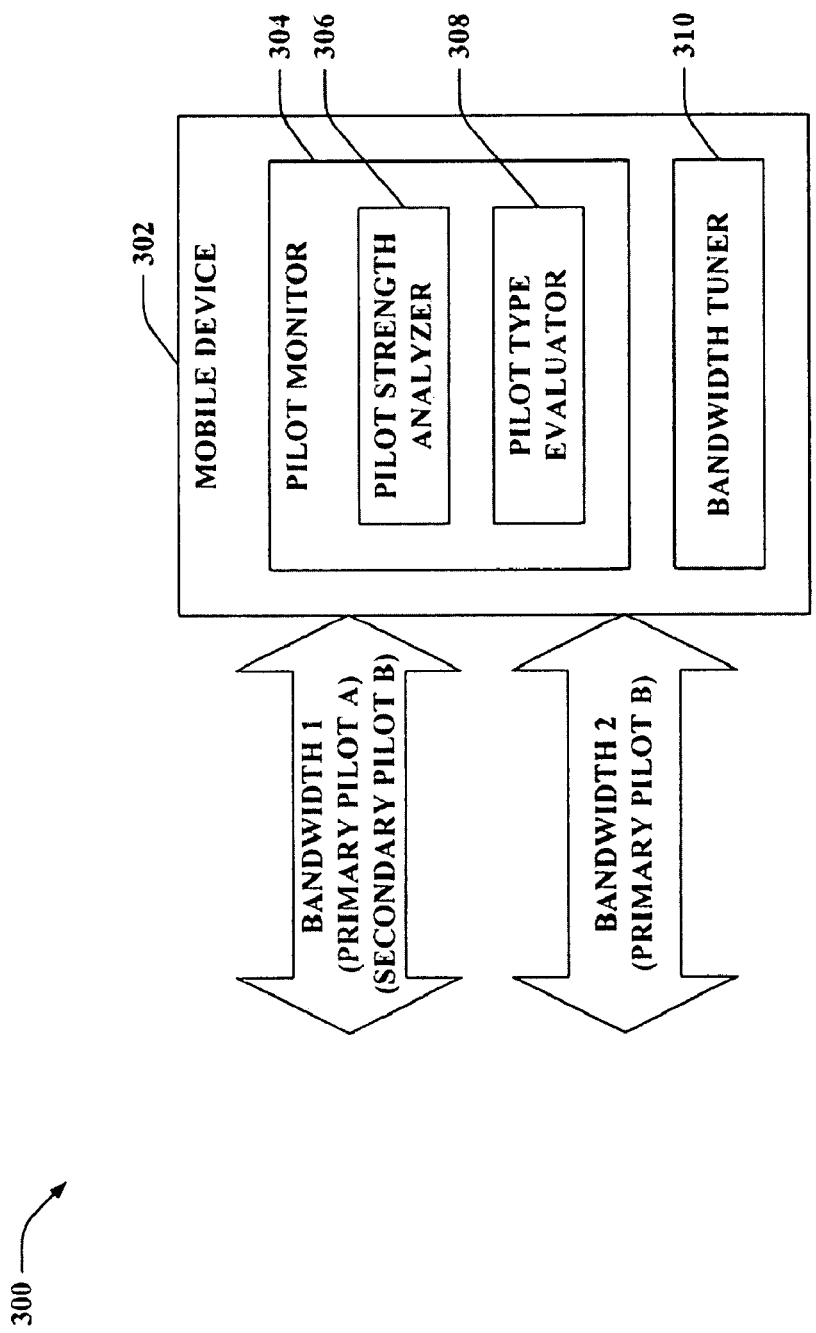
FIG. 3 is an illustration of an example system that evaluates primary pilots and/or secondary pilots to enable handing off in a wireless communication environment.

Turning to FIG. 3, illustrated is a system 300 that evaluates primary pilots and/or secondary pilots to enable handing off in a wireless communication environment. System 300 includes a mobile device 302 that can communicate with one or more base stations (e.g., base station 202 of FIG. 2). Mobile device 302 can be positioned at a location where more than one bandwidth is employed for communication. For instance, two bandwidths (e.g., bandwidth 1 and bandwidth 2) can be employed as shown; it is to be appreciated, however, that any number of bandwidths can be utilized within a wireless network. At a given time, mobile device 302 can receive signal(s) communicated via one bandwidth. According to an example, at a time when mobile device 302 obtains signal(s) traversing over bandwidth 1, other signal(s) communicated via bandwidth 2 are not received by mobile device 302.

Mobile device 302 includes a pilot monitor 304 that can search for, obtain and/or evaluate pilot(s) communicated by one or more base stations. Pilot monitor 304 can determine an identity of a base station based upon the received pilot and/or determine whether to effectuate a handoff based upon an analysis of such pilot. Pilot monitor 304 can analyze pilot(s) while mobile device 302 is in idle state and/or connected state. While in idle state, mobile device 302 need not be receiving data in an active way; rather, mobile device 302 can obtain pages sent from a base station while in idle state. Further, mobile device 302 can be in connected state while monitoring for pilot(s) such that data can be communicated over a channel while substantially simultaneously obtaining and/or evaluating pilot(s).

Moreover, mobile device 302 can receive PDRs associated with received pilots and can assemble and retain such PDRs in a database. The database of PDRs can be leveraged, for example, when mobile device 302 moves away from a geographic region and returns to that geographic region at a later time. Thus, rather than accumulating the PDRs again, mobile device 302 (and/or pilot monitor 304) can employ the PDRs in the database, which can provide quicker access.

Pilot monitor 304 can further include a pilot strength analyzer 306 and a pilot type evaluator 308. Pilot strength analyzer 306 can determine a strength of each received pilot. Moreover, pilot strength analyzer 306 can compare strengths of a plurality of received pilots to each other (e.g., to identify a pilot with a maximum strength). The pilot strengths yielded by pilot strength analyzer 306 can by leveraged by pilot monitor 304 to effectuate handoff decisions.

Pilot type evaluator 308 can determine whether an obtained pilot is a primary pilot or a secondary pilot. For instance, a PDR corresponding to a pilot can be received (e.g., via a data channel, control channel, from memory, . . . ) by mobile device 302, and pilot type evaluator 308 can analyze information included therein to identify whether the pilot is primary or secondary. According to another illustration, pilot type evaluator 308 can evaluate information incorporated within a received pilot to determine whether such pilot is primary or secondary. Moreover, upon pilot type evaluator 308 identifying that a particular pilot is a secondary pilot, a bandwidth upon which a corresponding primary pilot is communicated can be determined (e.g., the bandwidth of the primary pilot associated with the strongest measured pilot, which happens to be a secondary pilot, can be deciphered based upon the PDR, . . . ).

Mobile device 302 additionally includes a bandwidth tuner 310 that controls a bandwidth listened to by mobile device 302. Further, bandwidth tuner 310 can transition between bandwidths for receiving signal(s). According to an example, bandwidth tuner 310 can tune mobile device 302 to obtain signal(s) upon bandwidth 1 at a first time. While tuned to bandwidth 1, pilot monitor 304 can obtain primary pilot A (e.g., sent by base station A (not shown)) and secondary pilot B (e.g., sent by base station B (not shown)). Pilot strength analyzer 306 can determine strengths of primary pilot A and secondary pilot B. If primary pilot A is identified as being the strongest measured pilot, then pilot type evaluator 308 can determine that it is a primary pilot; thus, bandwidth tuner 310 need not alter the bandwidth upon which mobile device 302 listens. Moreover, if secondary pilot B is measured to be the strongest by pilot strength analyzer 306, then pilot type evaluator 308 can determine that such pilot is a secondary pilot and that the corresponding primary pilot is communicated via bandwidth 2; thereafter, bandwidth tuner 310 can enable mobile device 302 to tune to bandwidth 2 to receive data.

Figure 4:
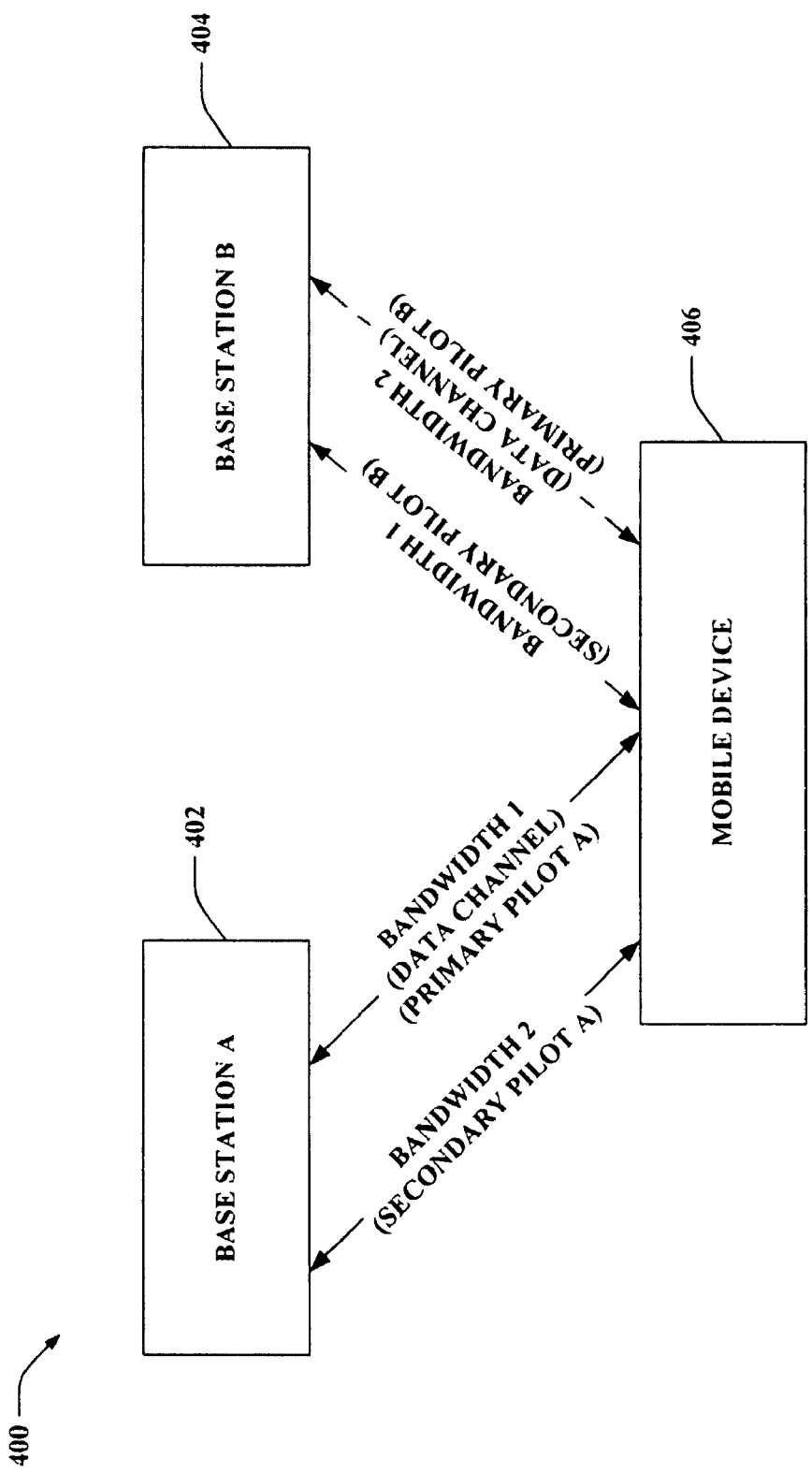
FIG. 4 is an illustration of an example system that enables searching for pilots and effectuating handoffs in a wireless communication environment.

Turning to FIG. 4, illustrated is a system 400 that enables searching for pilots and effectuating handoffs in a wireless communication environment. System 400 includes a base station A 402 (e.g., base station 202 of FIG. 2) and a base station B 404 (e.g., base station 202) that can communicate with a mobile device 406 (e.g., mobile device 302 of FIG. 3) utilizing two bandwidths (e.g., bandwidth 1, bandwidth 2); it is to be appreciated, however, that system 400 depicts an example and any number of base stations, any number of mobile devices, and any number of bandwidths can be utilized in connection with the claimed subject matter. Base station A 402 can transmit a primary pilot A over bandwidth 1 (e.g., bandwidth 1 can include a data channel associated with base station A 402) and a secondary pilot A over bandwidth 2. Base station B 404 can transmit a primary pilot B over bandwidth 2 (e.g., bandwidth 2 can include a data channel associated with base station B 404) and a secondary pilot B over bandwidth 1. Further, mobile device 406 can operate in idle state and/or connected state.

While in idle state, mobile device 406 can search for pilots. To measure the strengths of different base stations (or differing sectors), mobile device 406 can measure the pilots only on one frequency bandwidth at a given time and determine the strongest measured pilot. According to an illustration, mobile device 406 can listen to bandwidth 1, and thus, can receive and determine strengths of primary pilot A from base station A 402 and secondary pilot B from base station B 404. Moreover, mobile device 406 can utilize PDRs to determine that primary pilot A is a primary pilot and secondary pilot B is a secondary pilot. Further, mobile device 406 can employ the PDRs to identify a bandwidth of a primary pilot associated with secondary pilot B (e.g., primary pilot B can be determined to be communicated upon bandwidth 2). Hence, if secondary pilot B is measured to be the strongest pilot, mobile device 406 can select to register to receive pages from primary pilot B upon bandwidth 2. As a result, power can be saved during the pilot search phase, and complexity at mobile device 406 can be lessened.

Pursuant to another example, mobile device 406 can be in connected state. While searching for pilots in connected state, measurements can be performed at mobile device 406, while an active set can be decided at the network. The active set is a set of primary pilots where a mobile device has assigned resources, and with which the mobile device can readily communicate. According to an illustration, mobile device 406 can be connected to base station A 402 (e.g., utilizing bandwidth 1). Mobile device 406 can measure strengths of primary pilot A and secondary pilot B. Thereafter, mobile device 406 can report to the signal strengths received from the base stations (or sectors) to the network. If mobile device 406 reports strong signal strengths from a primary pilot, the network can add the primary pilot to the active set. If the terminal reports strong signal strength from a secondary pilot, the network can add a primary pilot of the base station (or sector) transmitting the secondary pilot to the active set. Thus, the secondary pilot can help mobile device 406 measure signal strength from a base station (or sector) that has a primary pilot on some other frequency.

While in connected state, mobile device 406 can effectuate fast switching. For base stations (or sectors) that are in the active set, mobile device 406 can decide to switch to one of the base stations depending on the signal strength received from the base station. For instance, mobile device 406 can have primary pilots from two base stations 402-404 in its active set, and the two pilots can be on different frequencies (e.g., primary pilot A on bandwidth 1 and primary pilot B on bandwidth 2). Then, while mobile device 406 is communicating on bandwidth 1 with base station A 402, it can measure the secondary pilot (e.g., secondary pilot B) transmitted on bandwidth 1 by base station B 404. If this secondary pilot has sufficient signal strength, mobile device 406 can switch to bandwidth 2 and begin communicating with base station B 404. The measurement and decision process at mobile device 406, for instance, can be helped by knowledge of the transmit powers of the primary and secondary pilots, and other information about the secondary pilots (e.g., which can be provided as part of the PDRs).

Figure 5:
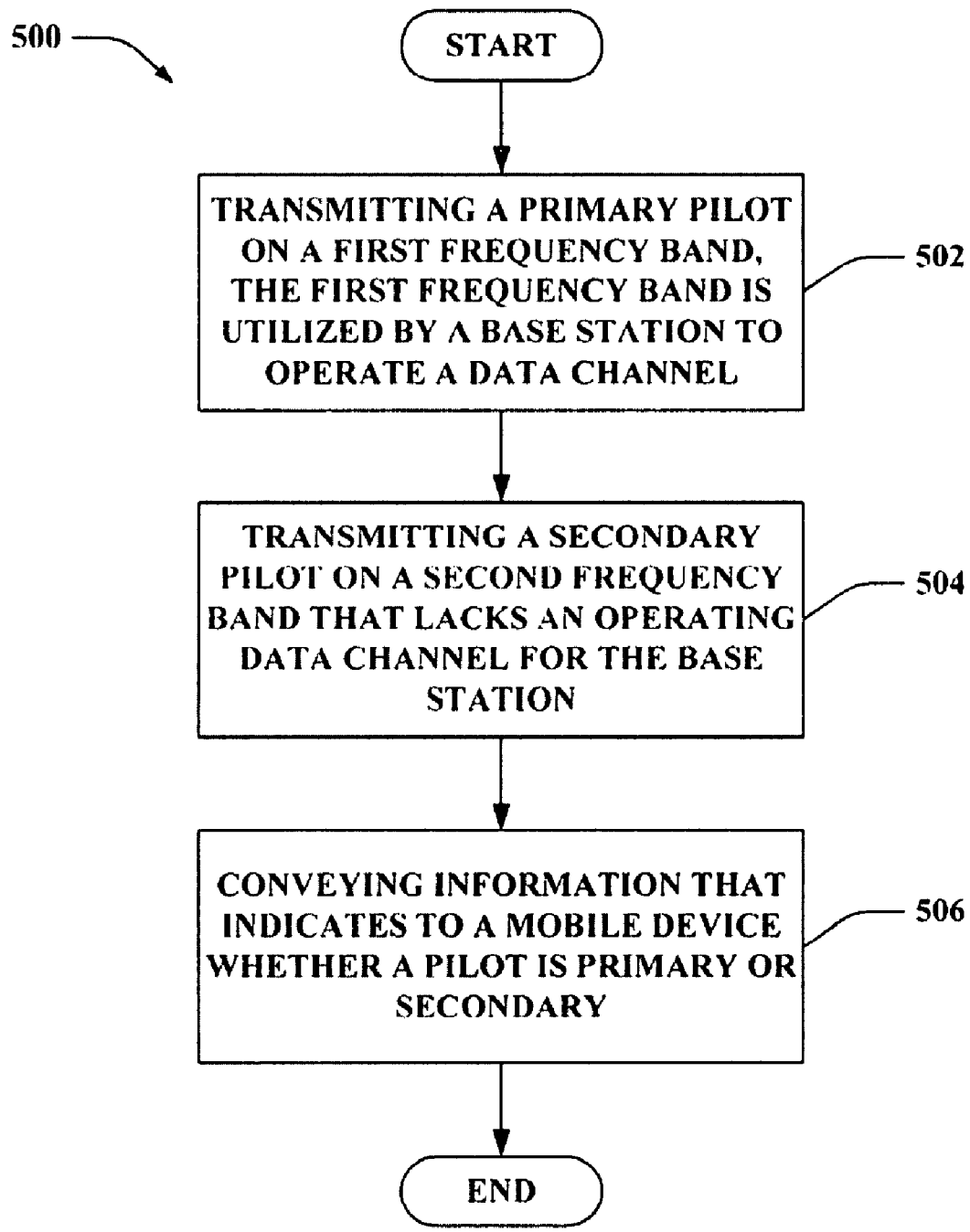
FIG. 5 is an illustration of an example methodology that facilitates communicating pilots upon differing frequency bands in a wireless communication environment.
Figure 6:
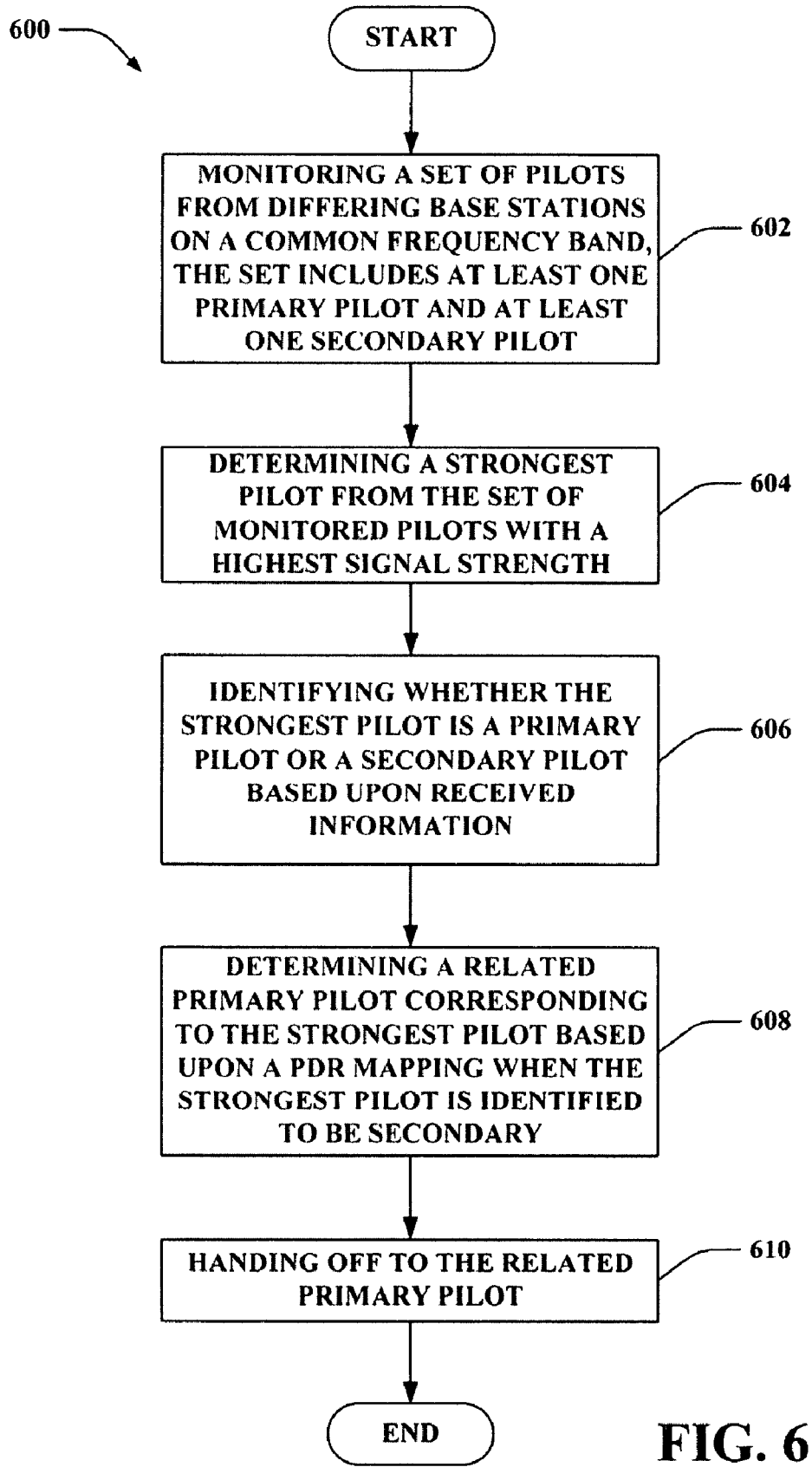
FIG. 6 is an illustration of an example methodology that facilitates evaluating pilots to enable handing off within a wireless communication environment.

Referring to FIGS. 5-6, methodologies relating to utilizing primary and secondary pilots to enable enhancing acquisition and handoff in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Turning to FIG. 5, illustrated is a methodology that facilitates communicating pilots upon differing frequency bands in a wireless communication environment. At 502, a primary pilot can be transmitted on a first frequency band, where the first frequency band can be utilized by a base station to operate a data channel. The first frequency band can be a primary channel. Moreover, it is contemplated that the base station can have any number of primary channels, and primary pilots can be communicated via the primary channels. At 504, a secondary pilot can be transmitted on a second frequency band that lacks an operating data channel for the base station. It is to be appreciated that any number of secondary pilots can be sent upon any number of non-primary channels (e.g., frequency bands that lack operating data channels associated with the particular base station). Further, the second frequency band can be a different channel within a same BandClass as the first frequency band. According to another example, the first frequency band and the second frequency band can be channels on different BandClasses. At 506, information that indicates to a mobile device whether a pilot is primary or secondary can be conveyed. For instance, the information can be included in a Pilot Description Record (PDR). According to an illustration, the PDR can be sent upon a data channel, a control channel, etc. to the mobile device. Additionally or alternatively, the PDR can be transferred to a disparate, neighboring base station, and can thereafter be combined with one or more PDRs to form a Pilot Neighbor Record (PNR). The PDR can include, for instance, a number of pilots transmitted by base station 202 (or the sector) for each pilot, an identifier of the pilot (e.g., physical layer identification of the pilot, PilotID, . . . ), a frequency band, whether the pilot is primary or secondary, a mapping of physical layer information (e.g., pilotID and channel-band of a secondary pilot mapped to a channel-band of a corresponding primary pilot), a transmit power of the pilot, and/or other physical layer information about the pilot such as, for example, cyclic prefix, duration, etc. for an OFDM pilot. Pursuant to a further illustration, the primary pilot and/or the secondary pilot can be a beacon; however, the claimed subject matter is not so limited.

With reference to FIG. 6, illustrated is a methodology 600 that facilitates evaluating pilots to enable handing off within a wireless communication environment. At 602, a set of pilots from differing base stations can be monitored on a common frequency band, where the set can include at least one primary pilot and at least one secondary pilot. Monitoring can be effectuated while a mobile device is in idle state and/or connected state. At 604, a strongest pilot from the set of monitored pilots can be determined to have a highest signal strength. Thus, signal strengths of each of the monitored pilots can be measured and compared to each other. At 606, an identification can be effectuated regarding whether the strongest pilot is a primary pilot or a secondary pilot based upon received information. According to an illustration, the information can be obtained as part of a PDR (e.g., received from a base station corresponding to the strongest pilot). At 608, a related primary pilot corresponding to the strongest pilot can be determined based upon a PDR mapping when the strongest pilot is identified to be secondary. At 610, a handoff to the related primary pilot can be effectuated.

By way of example where the mobile device is in idle state, if the strongest pilot is identified to be a secondary pilot, a second frequency band of a primary pilot related to the strongest measured pilot can be determined. Moreover, a selection can be made to register to receive pages from the corresponding primary pilot upon the second frequency band.

According to another illustration, pilot searching can occur in connected state. Thus, the strongest pilot can be reported to a network. If the strongest pilot is a primary pilot, then the network can add the primary pilot to an active set. However, if the strongest pilot is a secondary pilot, the network can add a primary pilot of a base station that transmitted the secondary pilot to the active set. Moreover, other strong pilots can similarly be reported to the network, which can thereafter add to the active set in a substantially similar manner.

Upon having primary pilots added to the active set, fast switching can be effectuated while in connected state. For instance, a determination can be made to handoff to a differing base station based upon signal strength. By way of further illustration, while communicating on a first frequency band with a first base station, a secondary pilot can be measured from a second base station on the first frequency band. If the secondary pilot is sufficiently strong, a handoff can be effectuated to the second base station such that communication switches to employing a second frequency band.

It will be appreciated that, in accordance with one or more aspects described herein, inferences can be made regarding utilizing primary and second pilots to enable handing off. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a strongest pilot from a set of pilots that includes primary and secondary pilots. By way of further illustration, an inference can be made related to determining which primary pilot to select when a plurality of primary pilots associated with a common base station are available. It will be appreciated that the foregoing examples are illustrative in nature and are not intended to limit the number of inferences that can be made or the manner in which such inferences are made in conjunction with the various embodiments and/or methods described herein.

Figure 7:
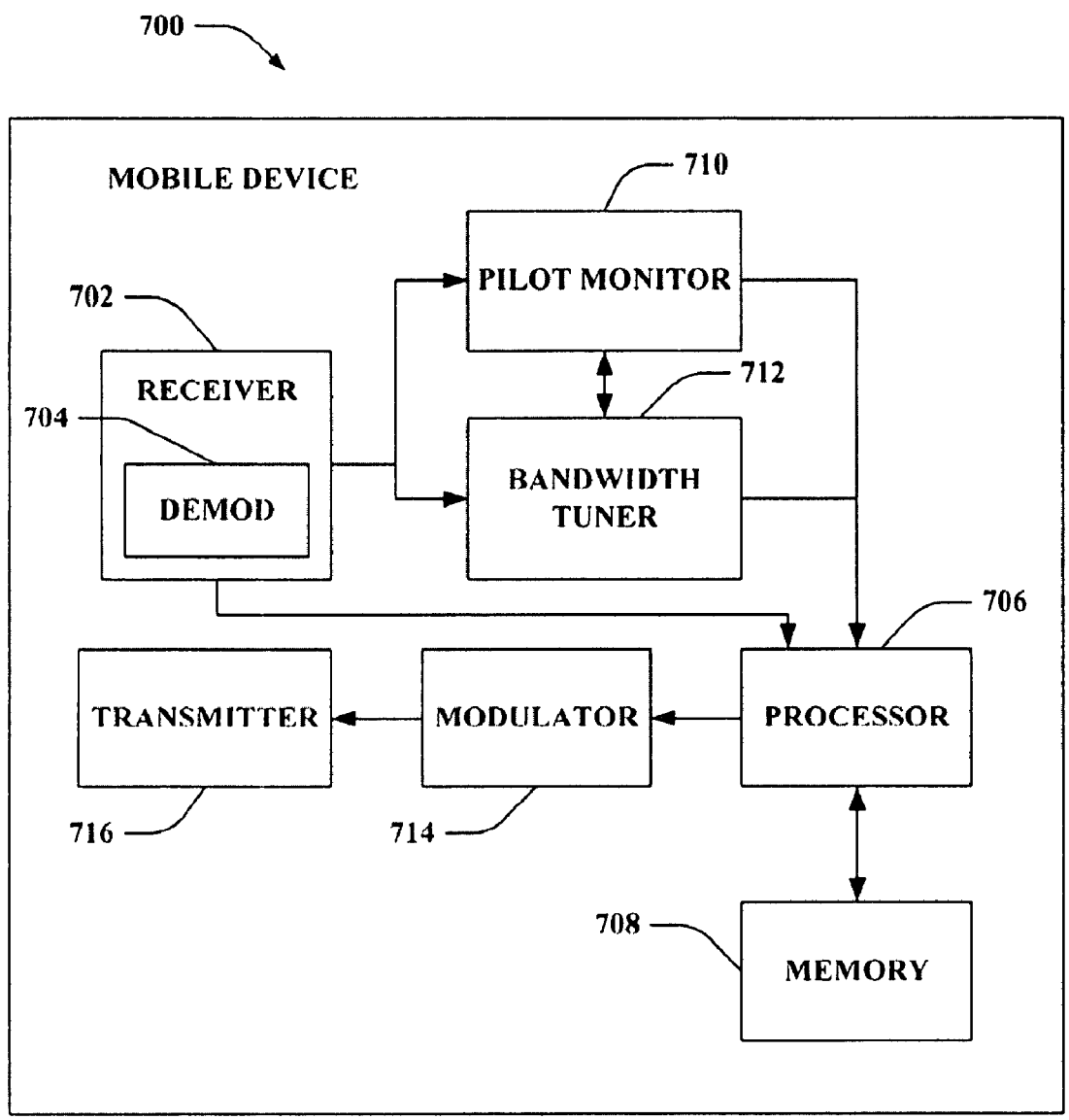
FIG. 7 is an illustration of an example mobile device that facilitates utilizing primary and secondary pilot(s) to handoff in a wireless communication system.

FIG. 7 is an illustration of a mobile device 700 that facilitates utilizing primary and secondary pilot(s) to handoff in a wireless communication system. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, data associated with analyzed pilots, and any other suitable information for selecting whether to effectuate a handoff. Memory 708 can additionally store protocols and/or algorithms associated with identifying monitoring primary and secondary pilots and/or handing off to base station(s) associated therewith. Further, memory 708 can retain PDRs received from one or more base stations.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to a pilot monitor 710 that evaluates pilot(s) obtained by receiver 702. Pilot monitor 710 can search for available pilots (e.g., primary, secondary) communicated upon a particular frequency band. Moreover, pilot monitor 710 can measure signal strengths associated with the received pilots. Pilot monitor 710 can also identify whether a pilot is a primary pilot or a secondary pilot (e.g., based upon information in a received PDR). Additionally, a primary pilot on a differing frequency band can be identified to be related to a received secondary pilot (e.g., sent from a common base station); pilot monitor 710 can effectuate such identification based upon information from the received PDR, for example. Further, pilot monitor 710 can perform an analysis to determine whether to handoff to a differing base station based upon the measured signal strengths. Pilot monitor 710 can evaluate primary and secondary pilots obtained via a common frequency band, thereby mitigating disruption associated with halting communication over one frequency band while searching for pilot(s) on other frequency bands as is common with conventional techniques. Additionally, a bandwidth tuner 712 can enable altering the frequency band upon which operation occurs. For instance, bandwidth tuner 712 can discontinue communicating via a first frequency band and initialize communicating via a second frequency band (e.g., based upon signal strengths determined by pilot monitor 710 and the frequency band of the primary pilot identified to be related to a received secondary pilot). Mobile device 700 still further comprises a modulator 714 and a transmitter 716 that transmits the signal to, for instance, a base station, another mobile device, etc. Although depicted as being separate from the processor 706, it is to be appreciated that pilot monitor 710, bandwidth tuner 712 and/or modulator 714 can be part of processor 706 or a number of processors (not shown).

Figure 8:
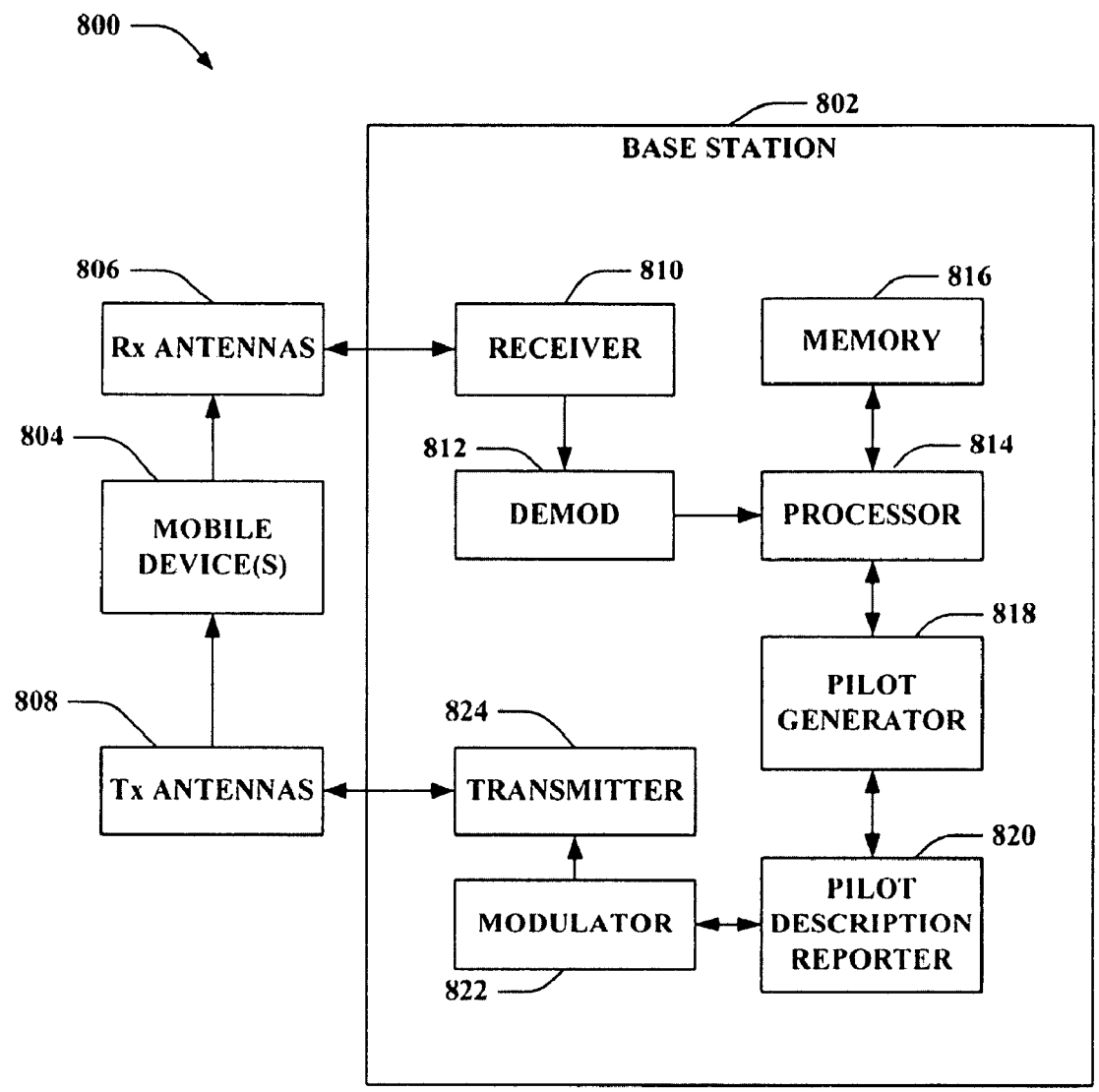
FIG. 8 is an illustration of an example system that facilitates generating primary and secondary pilots in a wireless communication environment.

FIG. 8 is an illustration of a system 800 that facilitates generating primary and secondary pilots in a wireless communication environment. System 800 comprises a base station 802 (e.g., access point, . . . ) with a receiver 810 that receives signal(s) from one or more mobile devices 804 through a plurality of receive antennas 806, and a transmitter 822 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to generating pilot(s), data to be transmitted to or received from mobile device(s) 804 (or a disparate base station (not shown)), and/or any other suitable information related to performing the various actions and functions set forth herein. Processor 814 is further coupled to a pilot generator 818 that constructs pilot(s) that can be sent to mobile device(s) 804. Pilot generator 818 yields primary pilots and secondary pilots to be communicated to mobile device(s) 804 as described herein.

Pilot generator 818 can be operatively coupled to a pilot description reporter 820 that obtains (e.g., generates, retrieves from memory, . . . ) a PDR and/or information to be included in the PDR corresponding to each pilot. Further, pilot description reporter 820 (and/or pilot generator 818) can provide the pilot(s) and/or PDRs to a modulator 822. Modulator 822 can multiplex the pilot(s) and/or PDR(s) for transmission by a transmitter 826 through antenna 808 to mobile device(s) 804. Although depicted as being separate from the processor 814, it is to be appreciated that pilot generator 818, pilot description reporter 820 and/or modulator 822 can be part of processor 814 or a number of processors (not shown).

Figure 9:
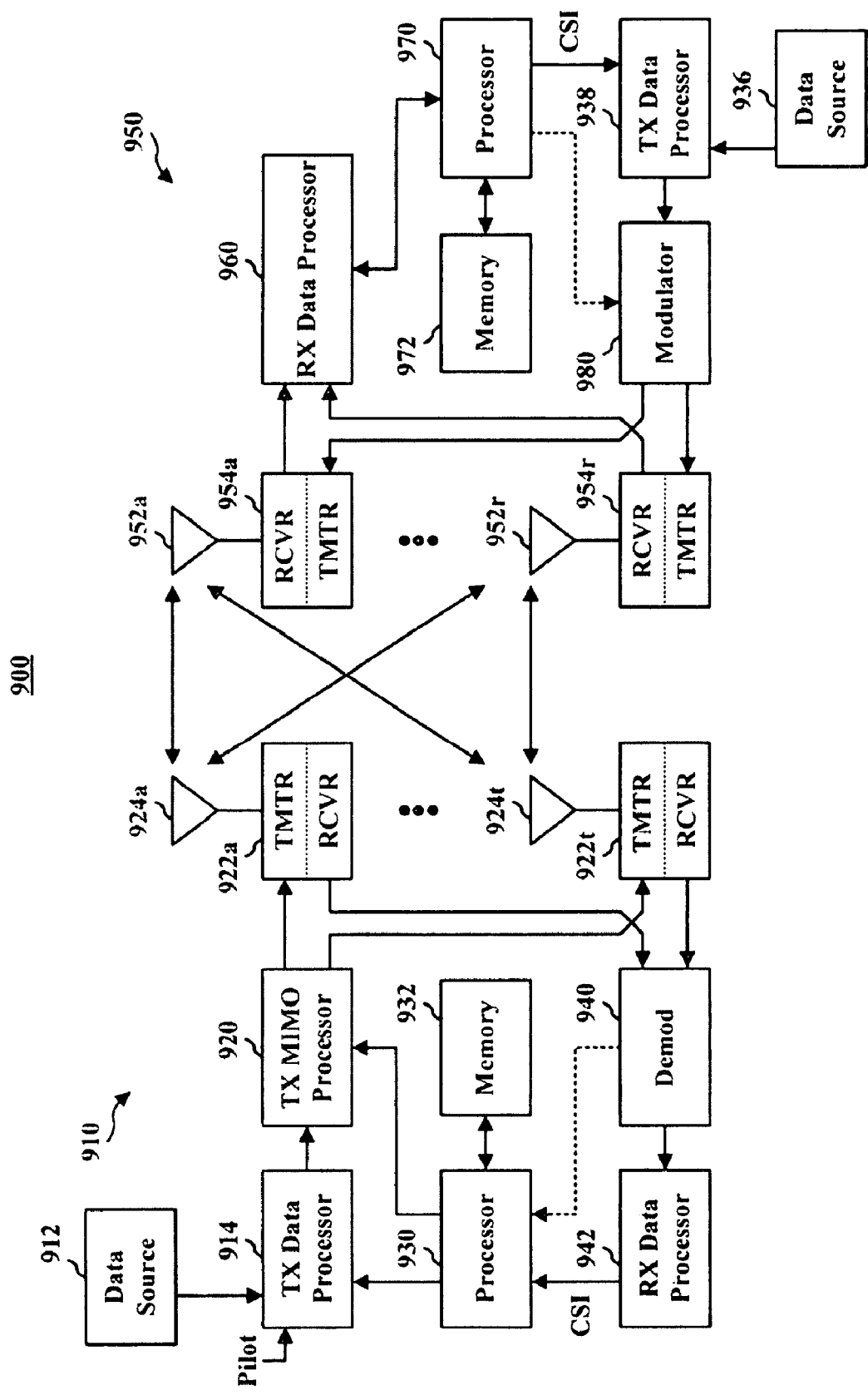
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4, 7-8, and 10-11) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which available technology to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
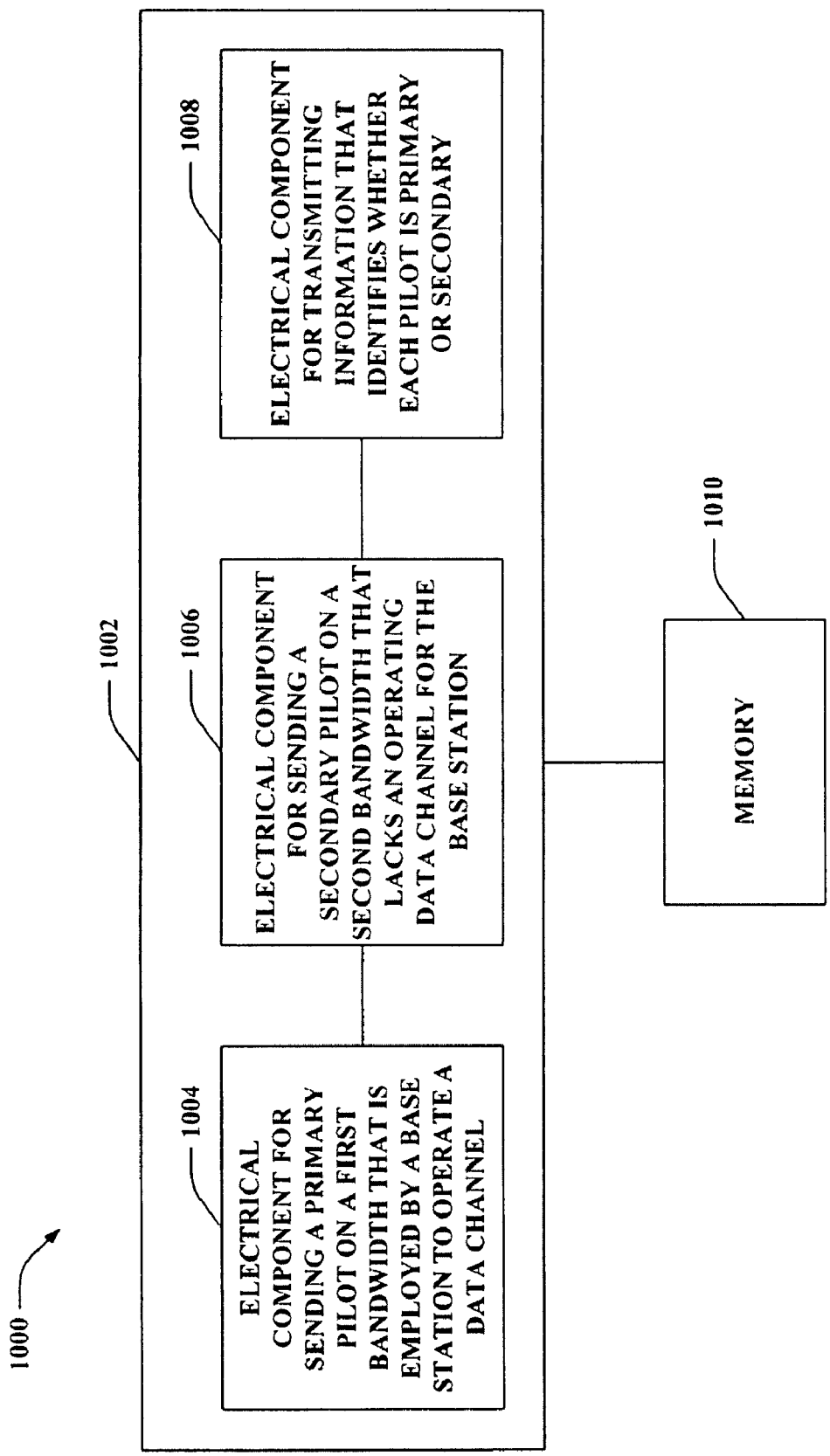
FIG. 10 is an illustration of an example system that enables communicating pilots for enhancing handoff in a wireless communication environment.

With reference to FIG. 10, illustrated is a system 1000 that enables communicating pilots for enhancing handoff in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for sending a primary pilot on a first bandwidth that is employed by a base station to operate a data channel 1004. Further, logical grouping 1002 can comprise an electrical component for sending a secondary pilot on a second bandwidth that lacks an operating data channel for the base station 1006. Moreover, logical grouping 1002 can include an electrical component for transmitting information that identifies whether each pilot is primary or secondary 1008. For example, the information can be included in a PDR associated with each pilot. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
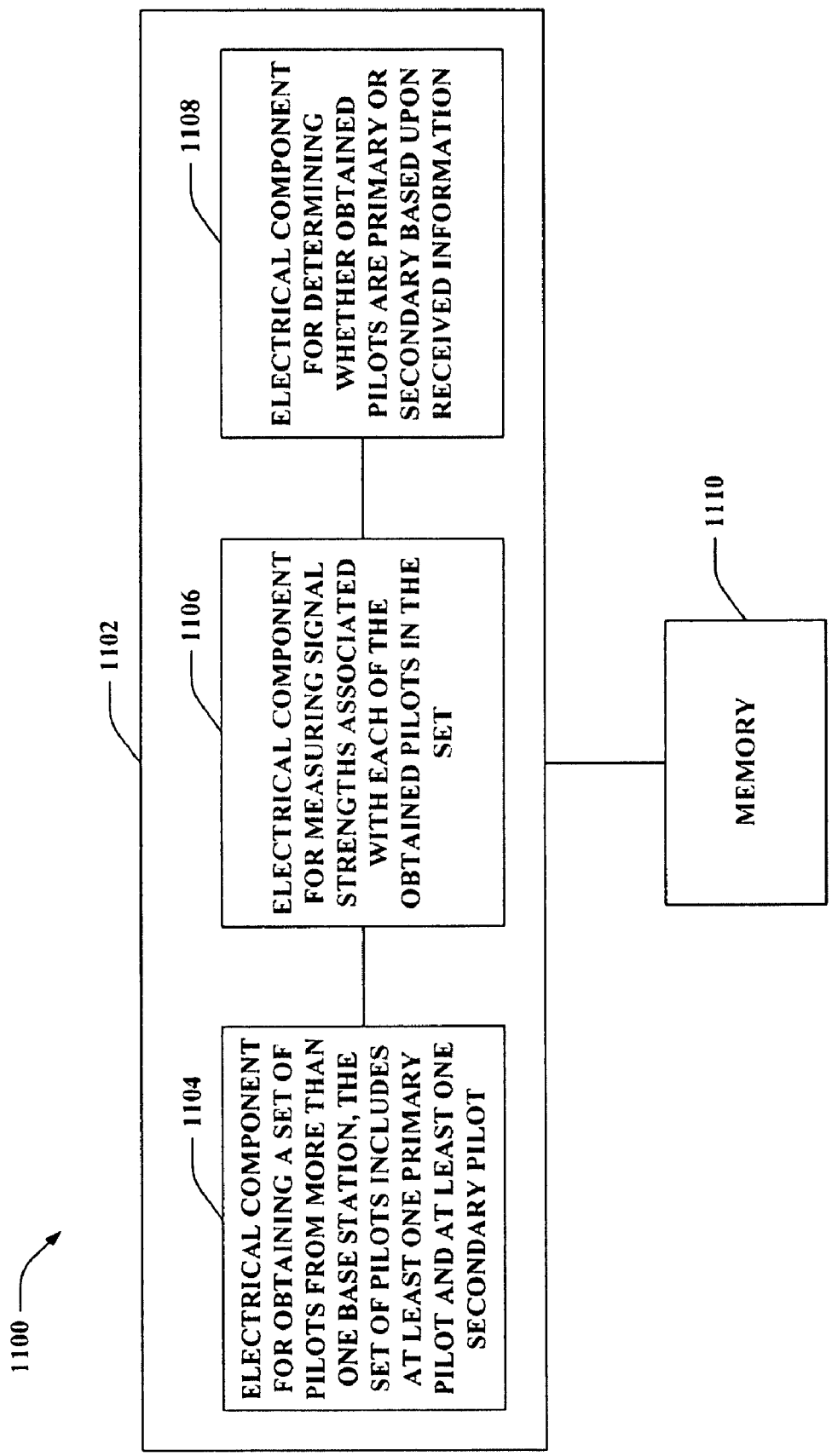
FIG. 11 is an illustration of an example system that enables handing off utilizing primary and secondary pilots in a wireless communication environment.

Turning to FIG. 11, illustrated is a system 1100 that enables handing off utilizing primary and secondary pilots in a wireless communication environment. System 1100 can reside at least partially within a mobile device, for instance. As depicted, system 1100 includes functional blocks that can represent functions implemented by a processor, software, or combination thereof (e.g., firmware). System 1100 includes a logical grouping 1102 of electrical components that can act in conjunction. Logical grouping 1102 can include an electrical component for obtaining a set of pilots from more than one base station, where the set of pilots includes at least one primary pilot and at least one secondary pilot 1104. Moreover, logical grouping 1102 can include an electrical component for measuring signal strengths associated with each of the obtained pilots in the set 1106. For example, a pilot with a highest associated signal strength can be determined. Further, logical grouping 1102 can include an electrical component for determining whether obtained pilots are primary or secondary based upon received information 1108. The received information, for instance, can be included in one or more PDRs. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method that facilitates communicating pilots upon differing frequency bands in a wireless communication environment, comprising:

transmitting, from a base station, a primary pilot on a first frequency band, the first frequency band is utilized by the base station to operate a data channel;

transmitting a secondary pilot on a second frequency band that lacks an operating data channel for the base station, wherein the second frequency band is different from the first frequency band; and conveying information that indicates to a mobile device whether a pilot is primary or secondary.

2. The method of claim 1, wherein the first frequency band is a primary channel associated with the base station.

3. The method of claim 1, conveying the information further comprises transmitting a Pilot Description Record (PDR) that includes data related to whether the pilot is primary or secondary.

4. The method of claim 1, the PDR includes at least one of a number of pilots transmitted by the base station for each pilot, an identifier of the pilot, a frequency band, whether the pilot is primary or secondary, a mapping of a pilotID and a channel-band of the secondary pilot to a channel-band of the primary pilot that corresponds, a transmit power of the pilot, or other physical layer information about the pilot.

5. The method of claim 4, further comprising sending the PDR to the mobile device via at least one of a control channel or a data channel.

6. The method of claim 4, further comprising transferring the PDR to a neighboring base station for combining with at least one disparate PDR to form a Pilot Neighbor Record (PNR).

7. The method of claim 1, wherein at least one of the primary pilot or the secondary pilot is a beacon.

8. The method of claim 1, wherein the first frequency band and the second frequency band are different channels within a same BandClass.

9. The method of claim 1, wherein the first frequency band and the second frequency band are channels on different BandClasses.

10. A wireless communications apparatus, comprising:

a memory that retains instructions related to transferring a first pilot on a first frequency band, transferring a second pilot on a second frequency band, wherein the second frequency band is different from the first frequency band, transferring information which indicates that the first pilot is a primary pilot, and transferring information which indicates that the second pilot is a secondary pilot, wherein a data channel for a base station employs the first frequency band and is lacking from the second frequency;

a processor, coupled to the memory, configured to execute the instructions retained in the memory.

11. The wireless communications apparatus of claim 10, wherein the memory further retains instructions related to transferring a Pilot Description Record (PDR) that includes at least one of the information which indicates that the first pilot is the primary pilot or the information which indicates that the second pilot is the secondary pilot.

12. The wireless communications apparatus of claim 11, wherein the memory further retains instructions related to transferring the PDR to a mobile device via at least one of a control channel or a data channel.

13. The wireless communications apparatus of claim 11, wherein the memory further retains instructions related to obtaining at least one disparate PDR from at least one neighboring base station and combining the PDR with the at least one disparate PDR to form a Pilot Neighbor Record (PNR).

14. The wireless communications apparatus of claim 11, wherein the PDR further includes an indication that the first pilot is related to the second pilot.

15. A wireless communications apparatus that enables communicating pilots for enhancing handoff in a wireless communication environment, comprising:
- means for sending a primary pilot on a first bandwidth that is employed by a base station to operate a data channel;
- means for sending a secondary pilot on a second bandwidth that lacks an operating data channel for the base station, wherein the second bandwidth is different from the first bandwidth; and
- means for transmitting information that identifies whether each pilot is primary or secondary.

16. The wireless communications apparatus of claim 15, further comprising means for sending a Pilot Description Record (PDR) that includes the information that identifies whether each pilot is primary or secondary, the PDR also includes a mapping of physical layer information for corresponding primary and secondary pilots.

17. The wireless communications apparatus of claim 16, further comprising means for sending the PDR via at least one of a control channel or a data channel.

18. The wireless communications apparatus of claim 16, further comprising means for assembling one or more disparate PDRs from neighboring base stations with the PDR to yield a Pilot Neighbor Record (PNR).

19. The wireless communications apparatus of claim 16, wherein the PDR further includes an indication that the primary pilot and the secondary pilot both originate from the base station.

20. A non-transitory machine-readable medium having stored thereon machine-executable instructions for:
- transferring a primary pilot on a first bandwidth that is employed by a base station to operate a data channel;
- transferring a secondary pilot on a second bandwidth that lacks an operating data channel associated with the base station, wherein the second bandwidth is different from the first bandwidth; and
- transferring a Pilot Description Record (PDR) that indicates to a mobile device whether each pilot is primary or secondary.

21. The machine-readable medium of claim 20, the machine-executable instructions further comprise transferring the PDR via one or more of a control channel or a data channel.

22. The machine-readable medium of claim 20, the machine-executable instructions further comprise transferring the PDR to a neighboring base station for combining with one or more disparate PDRs to generate a Pilot Neighbor Record (PNR).

23. The machine-readable medium of claim 20, wherein the PDR further indicates a relationship between the primary pilot and the secondary pilot.

24. In a wireless communications system, an apparatus comprising:
- a processor configured to:
    - transmit a primary pilot on a first bandwidth that is employed by a base station to operate a data channel;
    - transmit a secondary pilot on a second bandwidth that lacks an operating data channel associated with the base station, wherein the second bandwidth is different from the first bandwidth; and
    - transmit a Pilot Description Record (PDR) that indicates to a mobile device whether each pilot is primary or secondary.

* * * * *